Figure 4:
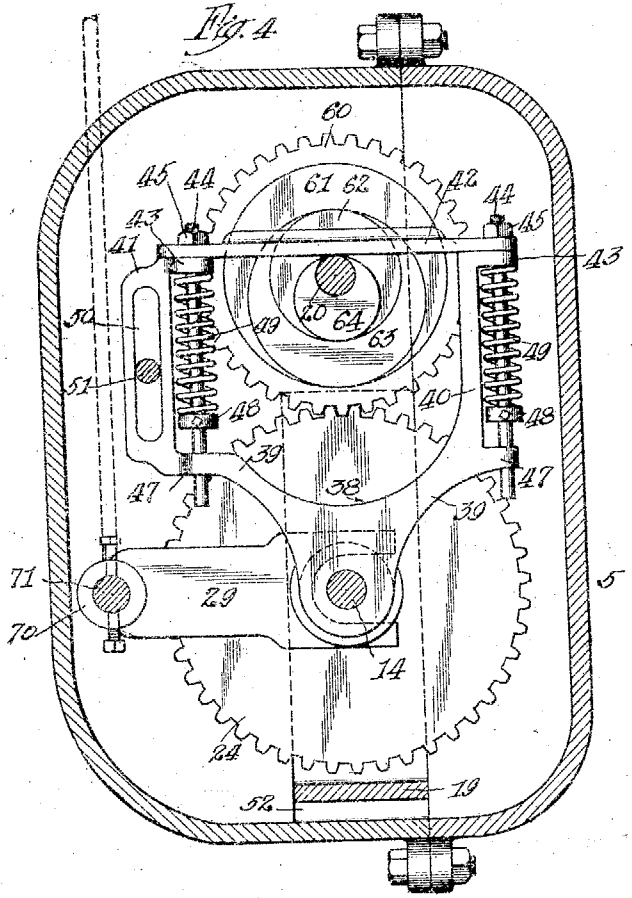

H. B. ROSS.
MECHANISM FOR TRANSMITTING MOTION.
APPLICATION FILED APR. 18, 1913.
Reissued Feb. 10, 1914.
13,686.
3 SHEETS—SHEET 1.
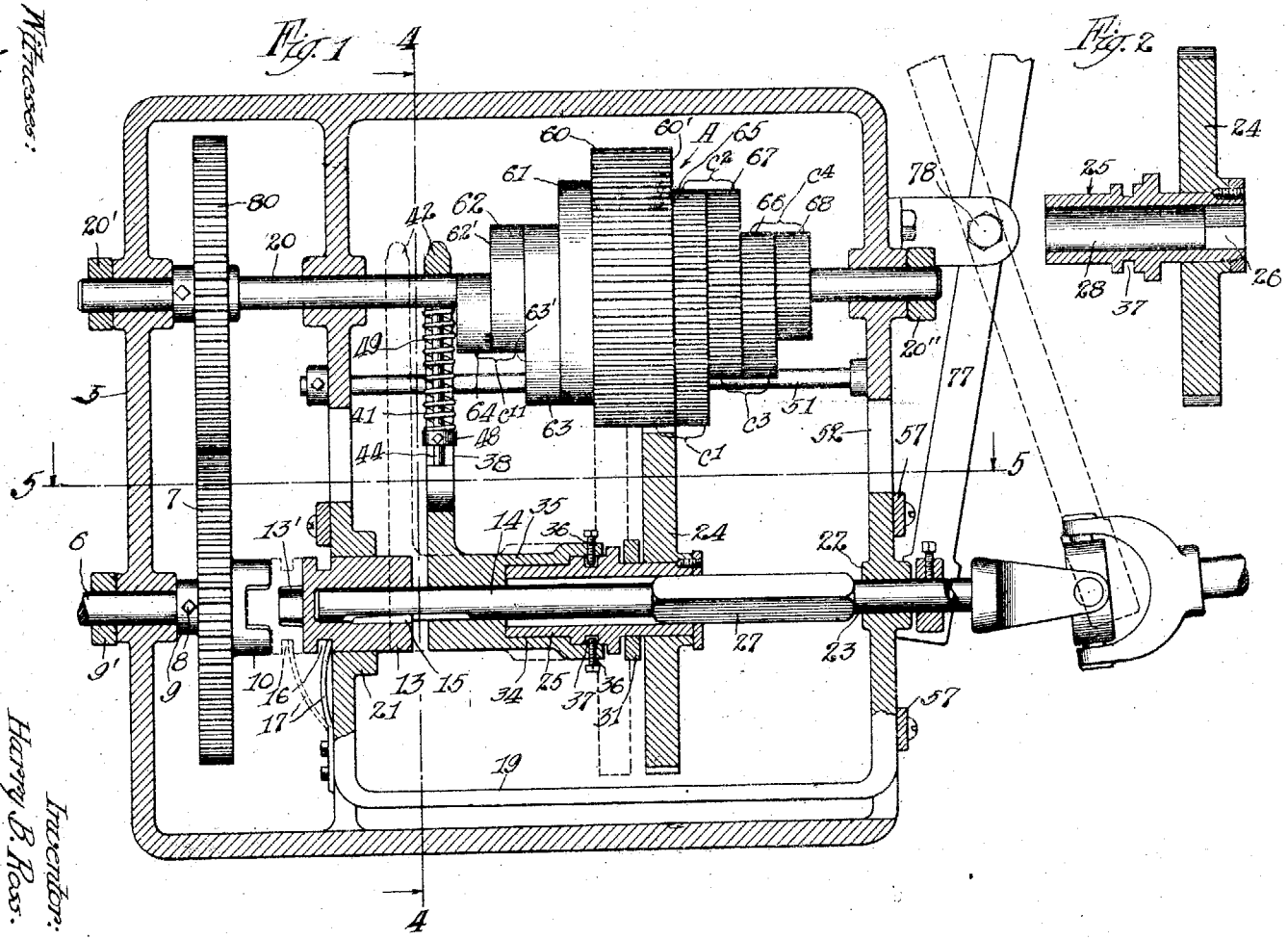
Witnesses:
Arthur Nelson
Earl E. Hour.
Inventor:
Harry B. Ross.
By
Atty.

H. B. ROSS.

MECHANISM FOR TRANSMITTING MOTION.

APPLICATION FILED APR. 18, 1913.

Reissued Feb. 10, 1914.

13,686.

3 SHEETS—SHEET 2.

Witnesses:
Arthur Nelson
Earl E. Howe

Inventor:
Harry B. Ross,
by Fisher, Brown & Kinsley
Atty.

H. B. ROSS.

MECHANISM FOR TRANSMITTING MOTION.

APPLICATION FILED APR. 18, 1913.

Reissued Feb. 10, 1914.

13,686.

3 SHEETS—SHEET 3

Witnesses:
Arthur Nelson
Earl E. Hood

Inventor:
Harry B. Ross.
By [illegible]
Atty.

UNITED STATES PATENT OFFICE.

HARRY BEAUREGARD ROSS, OF DETROIT, MICHIGAN, ASSIGNOR TO THE ROSS TRANSMISSION GEAR COMPANY, OF DENVER, COLORADO, A CORPORATION OF COLORADO.

MECHANISM FOR TRANSMITTING MOTION.

13,686. Specification of Reissued Letters Patent. Reissued Feb. 10, 1914.

Original No. 989,427, dated April 11, 1911, Serial No. 562,819. Application for reissue filed April 18, 1913. Serial No. 761,959.

*To all whom it may concern:*

Be it known that I, HARRY BEAUREGARD ROSS, a citizen of the United States, residing in the city of Detroit, county of Wayne, and State of Michigan, have invented certain new and useful Improvements in Mechanism for Transmitting Motion, of which the following is a specification.

My invention relates to improvements in variable speed gearing, such for example, as is used upon the automobile, of varying speed between the engine and the driving shaft or wheels of the vehicle.

The primary object of my invention is to provide gearing or mechanism of this character which shall serve constantly to connect the driving and driven shafts as distinguished from the gearing in common use in which the driving and driven shaft gears are thrown out of mesh during the speed changing period.

A further object of my invention is to provide variable speed transmission gearing in which the shifting of the speed changing gears can be accomplished substantially without clashing and in which the strains and shocks incident to the change, acceleration or diminution of the speed of the driven shaft are kept at a minimum.

Having reference to the gearing of the construction shown in the Patent No. 989,426 to H. B. and R. M. Ross, of April 11, 1911, a special object of this invention is to provide means whereby the coacting gears in the shifting from one speed to another are constantly held in mesh and are not dependent upon a yielding spring pressure to accommodate the relative transposition of the changeable speed gearing.

Another object of my invention is to provide transmission gearing adapted by uniform rotation of a driving shaft to impart variable speed rotation to a driven shaft and which shall be capable of imparting motion directly from the driving to the driven shaft without the interposition of gearing.

My invention consists generally in mechanism for transmitting motion, comprising two active shafts, one serving as a driving shaft and the other as a driven shaft, speed varying gears operatively connecting the shafts, complementary cams, and a member yoking the two shafts together and co-acting with the complementary cams to cause the shafts to approach in proportion to the diameters of the speed changing gears.

My invention also consists in the novel arrangement, construction, and coöperation of the parts whereby the objects named above, and others which will appear hereinafter, are attained.

Figure 3:
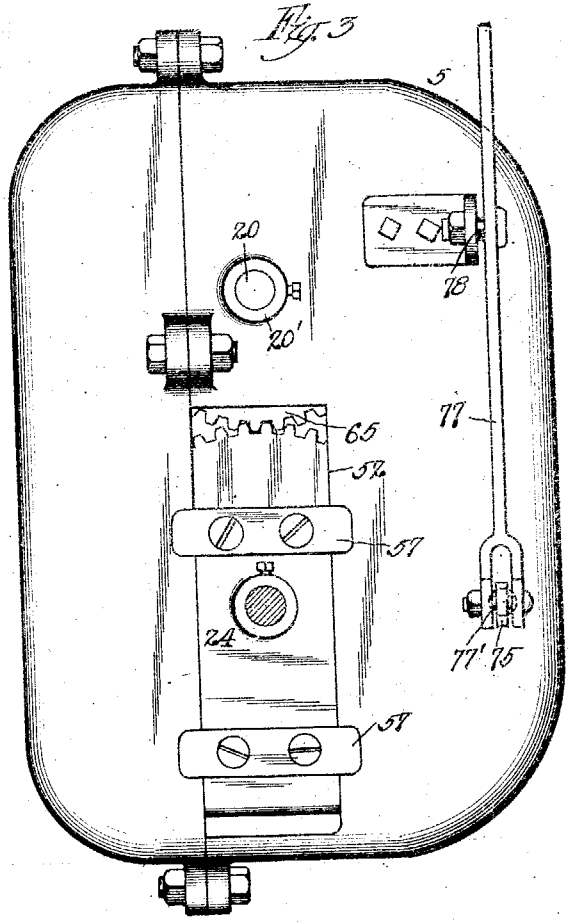
Figure 5:
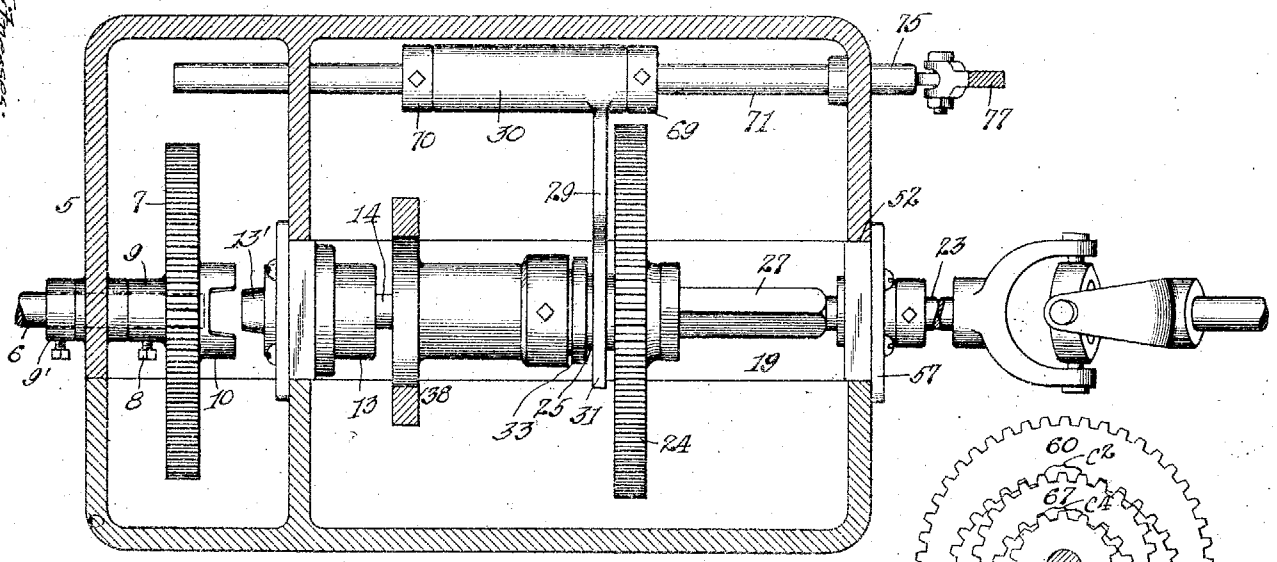
Figure 6:
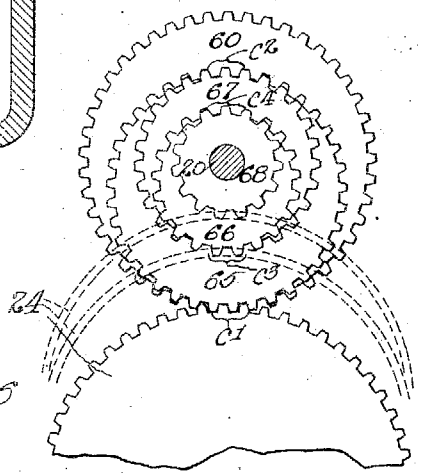

My invention will be more readily understood by reference to the accompanying drawings, which illustrate the preferred embodiment thereof, and in which:

Figure 1 is a vertical, longitudinal, section taken through my transmission gear mechanism, parts thereof being shown in elevation, and other parts, for the purpose of depicting the invention more clearly, being shown in section; Fig. 2 is a detail section through the master gear and the sleeve on which it is mounted; Fig. 3 is an end elevation of the gear case, the driven shaft being shown in cross section; Fig. 4 is a transverse vertical section taken substantially on the line 4—4 of Fig. 1; Fig. 5 is a horizontal section viewed in the direction of the arrows on the line 5—5 of Fig. 1; and Fig. 6 is a detail fractional end view of the change speed gears.

Variable speed transmission gearing is much used upon the automobile because of the fact that with a limited source of power it is desirable at times to propel it at high speed and at other times it is necessary, for example, when climbing grades and when starting the car to increase the power delivered to the driven shaft or axle in order that the engine shall be able to propel the car.

The automobile is usually so constructed with the parts so proportioned with reference to the power that most of the driving can be accomplished at high speed with a single reduction of speed between the engine shaft and the driven axle. It is therefore desirable in transmission gearing for the automobile to provide means of driving directly from the engine through a straight line of shafting to the driving axle. In this manner the loss of power is reduced to a minimum and the noise incident to the operation of the automobile is diminished.

While my invention is in no wise limited to transmission gearing for use on the automobile, I have nevertheless illustrated that form of my invention which is particularly adapted for such use, and I have therefore provided a direct drive upon the high speed, as will more fully appear hereinafter. When my mechanism is to be used for other purposes, it may not be necessary to provide a direct drive on the high speed, but such alterations are within the scope of my invention since the primary object is to provide variable speed motion transmitting mechanism.

The gearing here shown is inclosed in a suitable gear case 5, in which is journaled one end of a driving shaft 6. The shaft 6 extends within the casing and arranged thereon is a gear 7 which is secured firmly in place by means of a set screw 8 passing through the hub 9 of the gear. A collar 9′ is fastened to the shaft outside of the casing and in conjunction with the hub 9 of the gear 7 prevents longitudinal movement of the shaft 6. Mounted in the upper portion of the casing, in suitable bearings, is a shaft 20 which is secured against endwise movement by means of the collars 20′ and 20″ secured to the opposite ends of the shaft. Fixed on the shaft 20 in position to mesh with the gear 7 is a gear 80. The gear 80 is shown equal in size to the gear 7, but may, when it is desired to secure a greater reduction or increase of speed, be of any other desired size. I also provide a series of speed changing gears A on the shaft 20 for coöperation with a gear 24 mounted upon a shaft 14 arranged in the casing below the shaft 20. It will be seen, therefore, that the movement of the driving shaft 6 will cause a like movement of the shaft 20, and that the speed of the shaft 14 will depend upon which of the speed changing gears meshes with the gear 24 on the driven shaft 14. The driven shaft 14 is rotatably mounted in a vertically movable frame 19, one end 23 thereof being directly mounted in the bearing 22 of the frame 19 and the other end being journaled in a sleeve 13 which in turn is mounted in the bearing 31. The sleeve 13 is splined to the shaft 14 at 15, for longitudinal movement, and carries at its outer end a male clutch member 13′ for engagement with the female clutch member 10 carried by the gear 7. The manner of coupling these parts will be described in detail hereinafter.

The gear 24 is mounted to rotate with a sleeve 25 having a squared opening 26 to receive the squared portion 27 of the driven shaft. The remainder of the interior of the sleeve is cylindrical, as indicated at 28. It is obvious that when the parts are in the position shown in Fig. 1, the shaft 14 will be driven through the gears 7, 80, 60, and 24, the squared portion 26 of the gear 24 being in engagement with the squared portion 27 of the shaft 14.

The gear series A comprises a wide gear 60, eccentric gear 65, concentric gear 67, eccentric gear 66 and concentric gear 68. The maximum radius of the eccentric gear 65 is equal to the radius of the concentric gear 60 and the minimum radius is equal to the radius of the concentric gear 67. The maximum radius of the concentric gear 66 is equal to the radius of the concentric gear 67 and the minimum radius is equal to the radius of the concentric gear 68. Therefore certain of the teeth of the eccentric gears substantially coincide with certain of the teeth of the next larger and smaller contiguous concentric gears. To reduce the speed of the shaft 14 it is necessary to move the gear 24 from engagement with the gear 60 into engagement with the smaller gears of the speed changing series A, and it is at these coinciding teeth portions that the shifting takes place.

For the sake of clearness, I have indicated the coinciding teeth of contiguous gears by the characters $c^1$, $c^2$, $c^3$, $c^4$, and shall term these portions the "shifting paths." The gearing parts, as shown in Fig. 1, are in position for the gear 24 to shift along the path $c^1$ to the eccentric gear 65. Since the object of shifting is to get from the large gear 60 to the smaller gear 67 the eccentric gear 65 is merely a step between the two, and by keeping the gear 24 in engagement with the gear 65 it will upon half a revolution of the shaft 20 be in a position to shift along the path $c^2$ into engagement with the concentric gear 67. It is obvious, therefore, that the gear 24, in order to pass through the gear 65 to the gear 67, required not only longitudinal movement, but also vertical movement.

It is one of the objects of my invention to prevent clashing between the gears of the gear series A and the master gear 24 in order that the noise incident to the gear operation and also the strains upon the gearing may be reduced to a minimum. For this purpose I provide unique mechanism preventing longitudinal movement of the gear 24, except when it is within the zone or confines of one of the shifting paths $c^1$, $c^2$, $c^3$ or $c^4$. This same mechanism also serves to move the driven shaft toward the shaft carrying the gear series A. The mechanism comprises concentric cams 61 and 62 interspaced with eccentric gears 63 and 64, and I prefer to mount these cams as shown upon the shaft 20 contiguous to the gear series A. The shaft 20 also serves as a cam and the other cams are equal in number and width to the gear series A exclusive of the wide gear 60, and the outermost cam 64 is equal in eccentricity to the eccentric gear 65, and the eccentric cam 63 is equal in eccentricity to the eccentric gear 66. Coöperating with these cams is a yoke 38 which is loosely mounted upon the shaft 14 by means of the hub portion 35 containing a socketed portion 34 in which the sleeve 25 is rotatably held. The sleeve 25 is provided with an annular groove 37 and into this groove pins 36 carried by the hub 35 enter, thereby permitting rotation of the sleeve 25 within the yoke hub 35, but preventing longitudinal separation; hence when longitudinal movement is imparted to the gear 24 (by means to be described in detail hereinafter) the yoke 38 moves with it.

As is best shown in Fig. 4, the yoke 38 comprises two upwardly and outwardly extending arms 39 merging into vertical side portions 40 and 41 which extend substantially to the upper side of the shaft 20, connecting the upper ends of the side portions 40 and 41 and resting upon the shaft 20 is a tie or cross bar 42. I prefer to bind the cross bar 42 yieldingly to the remainder of the yoke and for this purpose perforate the bar and aline the perforations thereof with holes provided in the lug portions 43 and 47 of the yoke. I pass rods 44 through these registering holes and upon the upper portions of the rods provide nuts 45. Each of the rods 44 is provided with a stop collar 48 and between the stop collar and the under side of the lugs 43, I interpose compression springs 49 of sufficient strength normally to hold the cross bar 42 firmly in position at the upper end of the yoke and thereby to maintain the shaft 14 in proper working position.

As before stated, the frame 19 is vertically slidable in cut-out portions 52 in the walls of the casing, longitudinal movement of the frame 19 being prevented by means of the bars 57 secured to the ends of the frame 19 and engaging the walls of the casing. In this manner the shaft 14 is positively guided in its movement to and from the shaft 20.

To illustrate the shifting operation of the gears, let us consider the parts shown in Fig. 1. The gear is moved longitudinally on the shaft 14 into position under the gear 65, and this movement brings the cross bar 42 of the yoke into contact with the cam 64. As the shaft 20 rotates, the cam 64, through the medium of the yoke 38, raises the shaft 14 and thereby constantly maintains the proper coöperating position between the gears 24 and 65, as the gear 65 turns from its maximum to its minimum radius. When the shaft 20 is rotated a half revolution the gear path $c^2$ will be in position over certain of the teeth of the gear 24, and at the same instant the cam path $c^{11}$ will be positioned under the cross bar 42. During the half revolution of the shaft 20, the gear 24 is prevented from longitudinal movement in either direction by virtue of the fact that the cross bar 42 engages the face 62′ of the cam 62, and the gear 24 engages the face 60′ of the gear 60. When, however, the cam path $c^{11}$ presents itself, the gear 24 may be moved along the gear path $c^2$ into engagement with the concentric gear 67. There is no danger of moving the gear 24 off the gear 67 because the cross bar 42 limits the movement to the width of a gear abutting the face 63′ of the cam 63. The gear 24 will be held in the proper working engagement with the concentric gear 67 because the yoke will ride upon the concentric cam 62 until longitudinal movement is again imparted to the gear 24. In the same manner the gear 24 can be moved through eccentric gear 67 to the concentric gear 68 to cause a further reduction in speed of the driven shaft 14, and conversely the gear 24 can be moved along the shifting paths $c^4$, $c^3$, $c^2$, and $c^1$ in order to increase the speed of the driven shaft. The shifting paths $c^1$, $c^2$, $c^3$ and $c^4$ taken together form a continuous shifting path through all of the gears. It should be noted that when the gear 24 is moved from the smallest of the gear series to the largest that the eccentric gears, as well as forming a step between the concentric gears on each side thereof, also serve to repel the driven shaft 14 from the shaft 20.

It is desirable to guide the yoke 38 in its vertical movement in order to maintain its central contact with the cams and for this purpose I prefer to slot the arm 41, as indicated at 50, and pass therethrough a loosely fitting guide rod 51 which is suitably mounted in the casing. By the unique mechanism described, I am able to maintain the spaced relation of the shafts 14 and 20 to cause the gear 24 on the driven shaft and the gears of the change speed series to work in the true pitch relation. This I consider an extremely important feature of my gearing, since it prevents undue grinding of the gears, reduces the noise incident to gear transmission, and permits the use of true gear teeth. It is obvious also that since the master gear is never withdrawn from the speed changing gears in passing from highest to lowest speed or vice versa that there will be little strain imposed upon the mechanism in overcoming the inertia of the driven shaft when increasing or decreasing the speed thereof.

I shall now describe the mechanism for moving the gear 24 and yoke 38 longitudinally on the shaft 14. This mechanism comprises a shaft 71 longitudinally movable in the casing 5. Mounted upon the shaft 71 by means of a hub 30 is an arm 29. The hub 30 is free to rock on the shaft 71 but is prevented from longitudinal movement thereon by stop collars 69 and 70. The arm 29 has a forked end 31 which straddles the sleeve 25 entering between the flange 33 and the gear 24. A portion 75 of the shaft 71 extends without the casing, and is pivotally attached to a lever 77 by means of a slot and pin connection 77′ indicated by dotted lines in Fig. 1, fulcrumed at 78. By throwing the lever 77 from its full line position, shown in Fig. 1, to the dotted position, the gear 24 may be moved longitudinally on the shaft 14 from the gear 60 to the gear 68. This is obvious since the shaft 71 is given a longitudinal movement and the arm 29 moving therewith shifts the gear. When a higher speed than that attained by driving from the gear 60 through the gear 24 is desired I move the lever 77 in the direction of the arrow H (Fig. 1) thereby causing the gear 24 to shift along the gear 60 to the position shown in dotted lines. This movement also moves the yoke 38 longitudinally of the shaft causing the hub 35 thereof to push the sleeve 13 carrying the male clutch member 13′ over into engagement with the female clutch member 10, as indicated by the dotted lines in Fig. 1. By this movement the gear 24 is moved off the squared portion 27 of the driven shaft and thereby rotates idly, and the shaft 14 is driven directly through the clutch parts from the shaft 6 by virtue of the fact that the member 13 is splined to the shaft 14, as indicated at 15. In order to withdraw the male clutch from the female clutch, when the gear 24 and yoke 38 are withdrawn, I provide a leaf spring 17 which enters a groove 16 in the sleeve 13.

When the shaft 14 is driven through the gears 60 and 24 the speed of the shaft 14 very nearly approaches the speed of the driving shaft 6, and there is therefore little clashing of the clutch parts as they move into operative position.

The objects outlined in the opening of the specification are attained by the structure herein shown and described, but since I am able to conceive of other structures whereby the substantial objects may also be attained, and since others skilled in the art will also perceive various modified structures, I do not limit myself to the specific structure herein shown and described.

I claim:

1. In means for transmitting motion, the combination of a driving shaft, a driven shaft, an interposed countershaft, a constant speed gearing connection between the driving and counter shafts, and a changeable speed-gearing connection between the countershaft and the driven shaft, consisting of a number of eccentric and concentric gears alternately arranged on the counter-shaft, and a concentric gear on the driven shaft, substantially as described.

2. In means for transmitting motion, the combination of a driving shaft, a driven shaft, an interposed countershaft, a direct clutch-connection between the driving and driven shafts, a gearing connection between the driving and counter-shafts, and a changeable speed gearing connection between the counter and driven shafts, consisting of alternately arranged eccentric and concentric gears mounted on the countershaft, and a movably mounted and cooperating gear mounted on the driven shaft.

3. In means for transmitting motion, the combination of a driving shaft, a driven shaft, and an interposed countershaft, the driving and driven shafts being in alinement, clutch mechanism for directly connecting the driving and driven shafts for imparting the maximum speed to the driven shaft, a gearing connection between the driving shaft and the countershaft, and a changeable speed gearing connection between the counter and driven shafts, consisting of a plurality of eccentric and concentric gears alternately arranged on the counter-shaft, and a concentric gear on the driven shaft.

4. In means for transmitting motion, the combination with a driving shaft, a driven shaft, an interposed countershaft, the driving and driven shafts being in alinement, clutch-mechanism directly connecting the driving and driven shafts, to impart to the latter the maximum speed, a gearing connection between the driving and counter shafts, changeable speed-gearing mechanism consisting of alternately arranged concentric and eccentric gears mounted on the countershaft, and a coöperating-gear mounted on the driven shaft.

5. In means for transmitting motion, the combination of a driving shaft, a driven shaft and a counter shaft, the driving and driven shafts being in axial alinement, a detachable clutch-connection between the driving and driven shafts for maximum speed, a constant gearing connection between the driving and counter shafts, and a changeable speed gearing connection between the counter and driven shafts, consisting of a number of eccentric and concentric gears, alternately arranged on the countershaft and a concentric coöperating gear on the driven shaft.

6. The combination of a driving shaft, a driven shaft, an interposed countershaft, a constant speed gearing connection between the driving and counter shafts, and a changeable speed gearing connection between the counter and driven shafts, including a number of eccentric and concentric gears alternately arranged on the countershaft, and a concentric gear on the driven shaft, the latter being movable toward and away from the counter shaft, and an operative connection between the driven and countershafts.

7. The combination of a driving shaft, a driven shaft an interposed counter shaft, a constant speed-gearing connection between the driving and countershafts, and a changeable speed-gearing connection between the counter and driven shafts, including a number of eccentric and concentric gears alternately arranged on the counter shaft, and a concentric gear on the driven shaft, the latter being movable toward and away from the counter shaft, a yoke connecting the driven and counter shafts and having a bar normally engaging the counter shaft, the yoke and the gear on the driven shaft being slidable on the driven shaft, eccentric and concentric collars also of varying diameters arranged alternately on the counter shaft for regulating the travel of the gear in a longitudinal direction on the driven shaft.

8. The combination of a driving shaft, a driven shaft, an interposed counter shaft, a constant speed-gearing connection between the driving and counter shafts, and a changeable speed-gearing connection between the counter and driven shafts, including a number of eccentric and concentric gears alternately arranged on the counter shaft, and a concentric gear slidably mounted on the driven shaft, whereby it may be brought successively into mesh with all the gears of the counter shaft.

9. The combination of a driving shaft, a driven shaft, an interposed counter shaft, a constant speed-gearing connection between the driving and countershafts, and a changeable speed-gearing connection between the counter and driven shafts, including a number of eccentric and concentric gears, alternately arranged on the countershaft, the eccentric gear between any two concentric gears having its maximum radius equal to the radius of the concentric gear on one side, while its minimum radius is equal to that of the concentric gear on the other side, and a concentric gear on the driven shaft, the latter being movable toward and away from the counter shaft, and the gear on the driven shaft being slidably mounted, whereby it may be brought successively into mesh with all the gears on the countershaft.

10. The combination of a driving shaft, a driven shaft, an interposed counter shaft, a number of gears of varying diameter fast on the counter shaft, the said gears comprising concentric gears and interposed eccentric gears, the maximum radius of an eccentric gear being the same as the radius of the concentric gear on one side, while the minimum radius is the same as the radius of the concentric gear on the other side, the counter shaft also being equipped with a number of eccentric and concentric collars, corresponding with the number of gears, a yoke connecting the driven and counter shafts and having a bar engaging the counter shaft, the concentric collars being interposed between the eccentric collars, the radius of each concentric collar being equal to the maximum radius of the eccentric collar on one side and the minimum radius of the eccentric collar on the other side, the minimum radius of the smallest eccentric collar being equal to that of the radius of the shaft, a concentric gear slidably mounted on the driven shaft, one of the two shafts connected by the yoke being movable toward and away from the other shaft in order to bring the gear of the driven shaft successively into mesh with all of the gears of the counter shaft.

11. In means for transmitting motion, the combination of a driving shaft, a driven shaft, an interposed counter shaft, a constant speed-gearing connection between the driving and counter shafts, a changeable speed-gearing connection between the counter and driven shafts, including a number of concentric and eccentric gears mounted on the counter shaft, the eccentric gears being interposed between the concentric gears, the maximum radius of any eccentric gear being equal to the radius of the larger adjacent concentric gear, while the minimum radius of any eccentric gear is equal to the radius of the smaller adjacent concentric gear, a concentric gear mounted on the driven shaft, a yoke connecting the driving and driven shafts, the yoke and gear being mounted to slide in unison on the driven shaft, whereby the gear on the last named shaft is adapted to be brought into mesh successively with all the gears of the counter shaft, the counter shaft also having eccentric and concentric collars of varying diameter, and alternately arranged, the yoke being arranged to successively engage the said collars simultaneously with the successive engagement of the gear on the driven shaft with the gears of the counter shaft, the engagement of the yoke, however, with the said collars being in the reverse order.

12. The combination of a driving shaft, a driven shaft, an interposed counter shaft, a constant speed-gearing connection between the driving and counter shafts, and a changeable speed-gearing connection between the counter and driven shafts, one of the last named shafts being adapted to move toward and away from the other, the said speed-gearing connection comprising a wide concentric gear fast on the counter shaft, a concentric gear slidably mounted on the driven shaft, and having its cogged periphery of less width than that of the wide gear with which it meshes, there being a number of other concentric gears of varying diameter, and eccentric gears interposed between the concentric gears, each eccentric gear having its maximum radius equal to the radius of the larger adjacent concentric gear, and its minimum radius equal to the radius of the smaller adjacent concentric gear, there being a number of eccentric and concentric-collars mounted on the counter shaft, the larger concentric collar being adjacent the said wide gear, the radius of the largest concentric collar being equal to the maximum radius of the adjacent eccentric collar, while the minimum radius of the largest eccentric collar is equal to the radius of the smaller adjacent concentric collar, the smallest eccentric collar having its maximum radius equal to the radius of the adjacent concentric collar, while its minimum radius is equal to that of the counter shaft, a yoke slidable on the driven shaft with the gear of the said shaft, the said yoke connecting the driven and counter shafts and successively engaging the eccentric and concentric collars as the gear on the driven shaft successively engages the gears on the counter shaft, substantially as described.

13. A variable speed gear mechanism comprising a frame or casing, in combination with one shaft having fixed bearings in said casing, a second shaft movably held in said casing, one of said shafts for receiving the power of a motor and to be driven thereby, speed changing gears on said shafts having a continuous shifting path comprising several steps, complementary cams, and a member yoking the two shafts together and coacting with said complementary cams to cause the movable shaft to approach the shaft having fixed bearings in harmony with the steps of the speed changing gears as relative movement is imparted to the gears of the fixed and movable shafts.

14. A variable speed gearing or transmission mechanism comprising two active shafts, one serving as a driving shaft and the other as a driven shaft, speed changing gears operatively connecting said shafts, complementary cams, and a member yoking the two shafts and coöperating with said complementary cams to cause the shafts to approach in harmony with the steps of the gears as relative movement is imparted to the coöperating gears causing the change of speed.

15. A variable speed gearing or transmission mechanism, comprising two active shafts, one serving as a driving shaft and the other as a driven shaft, speed changing gears operatively connecting said shafts, complementary cams, and a member yoking the two shafts together, means for imparting relative movement to the coöperating speed changing gears, said member yoking the two shafts together coacting with said complementary cams to cause the shafts to approach each other in harmony with the steps of the speed changing gears as the relative movement is imparted to the speed changing gears.

16. A variable speed gearing or transmission mechanism, comprising two active shafts, one serving as a driving shaft and the other as the driven shaft, a pyramid of concentric gears interspaced with eccentric gears on one of said shafts, and a gear on the other shaft coöperating with said pyramid of gears, complementary cams, a member yoking the two shafts together and coacting with said complementary cams to cause the shafts to approach one another in harmony with the steps of the gears as relative movement is imparted to the gear pyramid and coöperating gear of the other shaft.

17. A variable speed gearing or transmission mechanism comprising two active shafts, one serving as a driving shaft and the other as the driven shaft, speed changing gears operatively connecting said shafts, complementary cams and a member yoking the two shafts and coacting with said complementary cams to cause the shafts to approach and separate as the relative movement is imparted to the coöperating gears causing the speed change, and safety cushioning means for said yoke.

18. A variable speed gearing or transmission mechanism, comprising two active shafts, one serving as a driving shaft and the other as the driven shaft, one of said shafts having fixed bearings, and the other being movably held, speed changing gears on one of said shafts, and a single gear on the other of said shafts coacting with the speed changing gears, complementary cams on one of said shafts, a yoke carried by one of said shafts and coacting with said complementary cams to cause the movable shaft to approach the fixed shaft in harmony with the steps of the speed changing gears as the single gear is shifted.

19. A variable speed gearing or transmission mechanism, comprising two active shafts, one serving as a driving shaft and the other as a driven shaft, speed changing gears operatively connecting said shafts, complementary cams, and a member yoking the two shafts together, said yoking member coacting with the complementary cams to cause the shafts to approach in harmony with the steps of the speed changing gears as relative movement is imparted to the gears of the two shafts, the said yoke, cams and speed changing gears coöperating to prevent accidental relative longitudinal movement of the gears.

20. In a transmission gearing the combination of a rotatably fixed shaft, a shaft movable to and from said shaft, changeable speed gearing connection between the shafts, means yoking the shafts together and causing the movable shaft to approach the fixed shaft, said changeable speed gearing formed to impel the movable shaft from the fixed shaft during certain of the speed changing periods.

21. In changeable speed transmission gearing the combination of a frame, a shaft rotatably held in fixed bearings in the frame, a shaft movable to and from the fixed shaft, the speed changing gears operatively connecting the shafts, complementary cams, mechanism yoking the shafts together and coacting with said cams to cause the movable shaft to approach the fixed shaft, said speed changing gears formed to repel the movable shaft during certain of the speed changing operations.

22. In transmission gearing the combination of a frame, a shaft held in fixed bearings in said frame, a shaft movable toward and away from the fixed shaft, speed changing gears of varying sizes operatively connecting said shafts, complementary cams, a member yoking the two shafts together and coacting with said complementary cams to cause the movable shaft to approach the fixed shaft in harmony with the steps of the speed changing gears, said speed changing gears formed to impel the movable shaft from the fixed shaft as relative movement of the gears from the smaller to the larger takes place.

23. In transmission gearing the combination of a frame, a shaft rotatably held in fixed bearings in said frame, a shaft rotatably held in a bearing movable toward and away from the fixed shaft, changeable speed gearing operatively connecting the shafts, complementary cams, a member yoking the shafts together and coacting with said complementary cams to cause the movable shaft to approach the fixed shaft and permitting the gearing to cause the separation of the shafts at certain of the speed changing intervals, and mechanism for guiding the movable shaft in its movement to and from the fixed shaft.

24. In mechanism for transmitting motion, the combination of a frame, a shaft rotatably held in fixed bearings therein, a shaft movable toward and away from the fixed shaft, a pyramid of speed changing gears mounted on one of the shafts, a single gear mounted on the other shaft and meshing with the pyramid of gears, said pyramid comprising a number of concentric gears interspaced with eccentric gears, complementary cams arranged on one of said shafts and consisting of concentric cams interspaced with eccentric cams, a member yoking the shafts together and coacting with said cams to move the movable shaft toward the fixed shaft and permitting the eccentric gears to push the movable shaft during certain of the speed changing periods.

HARRY BEAUREGARD ROSS.

Witnesses:
H. Byrn Northrop,
Jos. H. Block.